United States Patent
Moriya

(10) Patent No.: US 7,518,674 B2
(45) Date of Patent: Apr. 14, 2009

(54) OPTICAL COMPENSATOR ELEMENT AND LIQUID CRYSTAL DISPLAY USING THE SAME

(75) Inventor: Norihisa Moriya, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 302 days.

(21) Appl. No.: 11/110,972

(22) Filed: Apr. 20, 2005

(65) Prior Publication Data

US 2006/0066785 A1    Mar. 30, 2006

(30) Foreign Application Priority Data

Apr. 21, 2004    (JP) ............................. 2004-124909

(51) Int. Cl.
*G02F 1/1347* (2006.01)

(52) U.S. Cl. ............................. 349/75; 349/74; 349/117

(58) Field of Classification Search .............. 349/74–78
See application file for complete search history.

(56) References Cited

U.S. PATENT DOCUMENTS 4,097,128 A * 6/1978 Matsumoto et al. ........... 349/78
6,674,498 B1 * 1/2004 Stallinga et al. ............... 349/76
6,727,967 B2 * 4/2004 Nakamura et al. ........... 349/114

FOREIGN PATENT DOCUMENTS

JP    09-105958    * 4/1997

* cited by examiner

*Primary Examiner*—Richard H Kim
(74) *Attorney, Agent, or Firm*—Burr & Brown

(57) ABSTRACT

Disclosed are an optical compensator element, which can realize switching between a wide angle of visibility and a narrow angle of visibility through a simple operation, and a liquid crystal display using the same. An optical compensation layer 4B' comprising, for example, a liquid crystal material having positive dielectric anisotropy sealed between two substrates comprising a transparent electrode and an aligning film stacked on top of each other is provided. An optical compensation layer 4A as a negative C plate and the optical compensation layer 4B' are stacked in that order on a homeotropically aligned liquid crystal cell 2A to constitute a liquid crystal display 1. Upon the application of voltage to the optical compensation layer 4B', a narrow angle of visibility is provided, while, when no voltage is applied, a wide angle of visibility is provided.

3 Claims, 5 Drawing Sheets

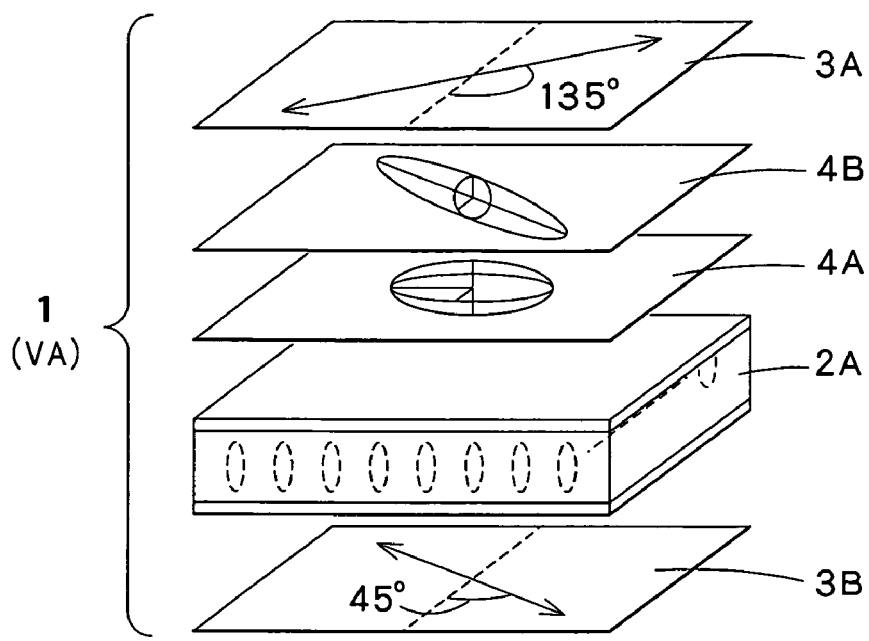
F I G. 1
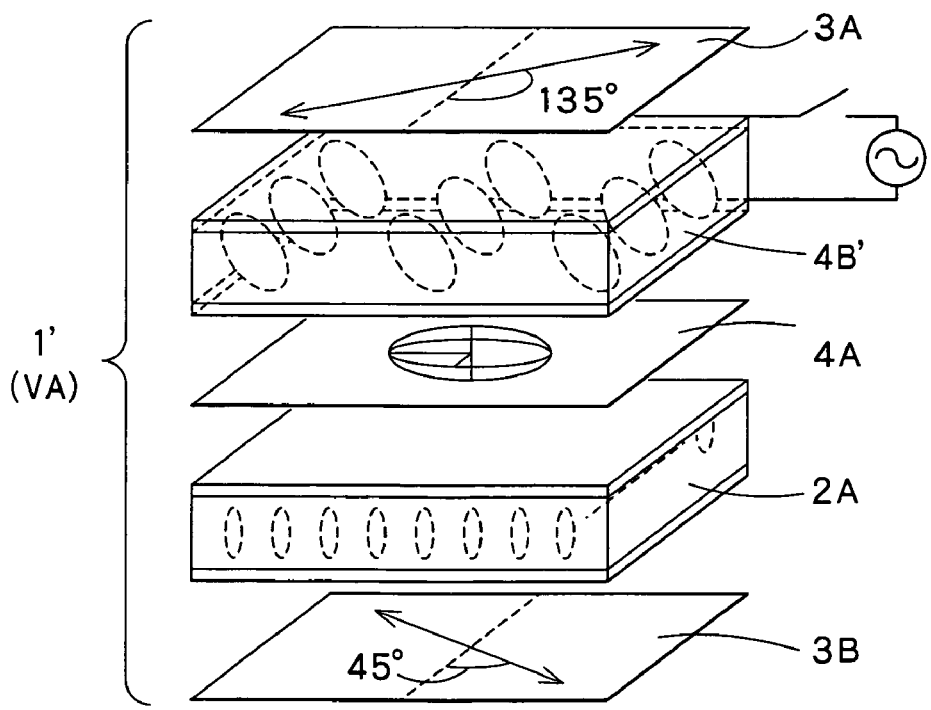
F I G. 2

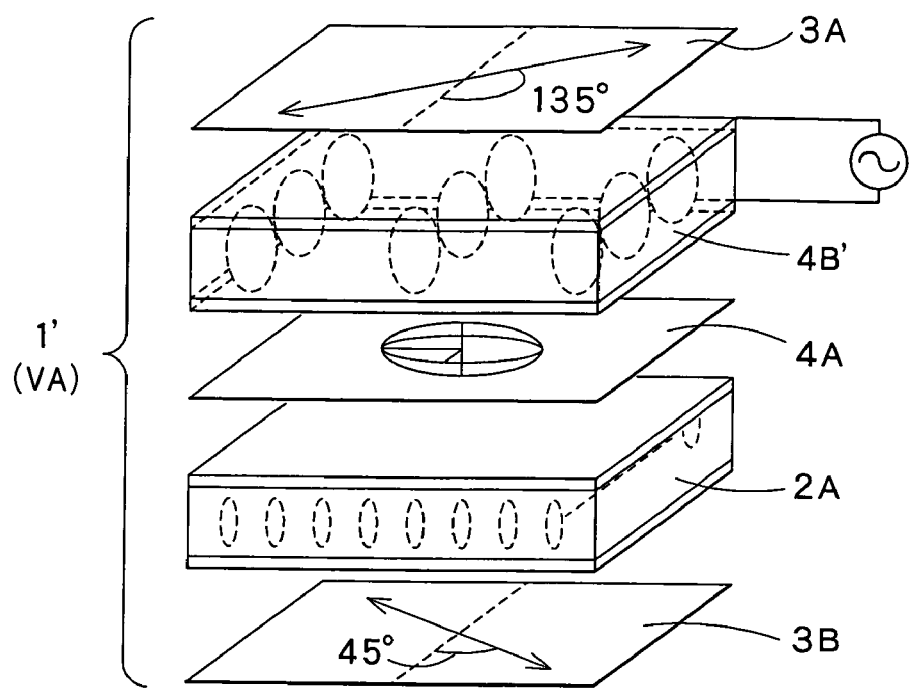
F I G. 3
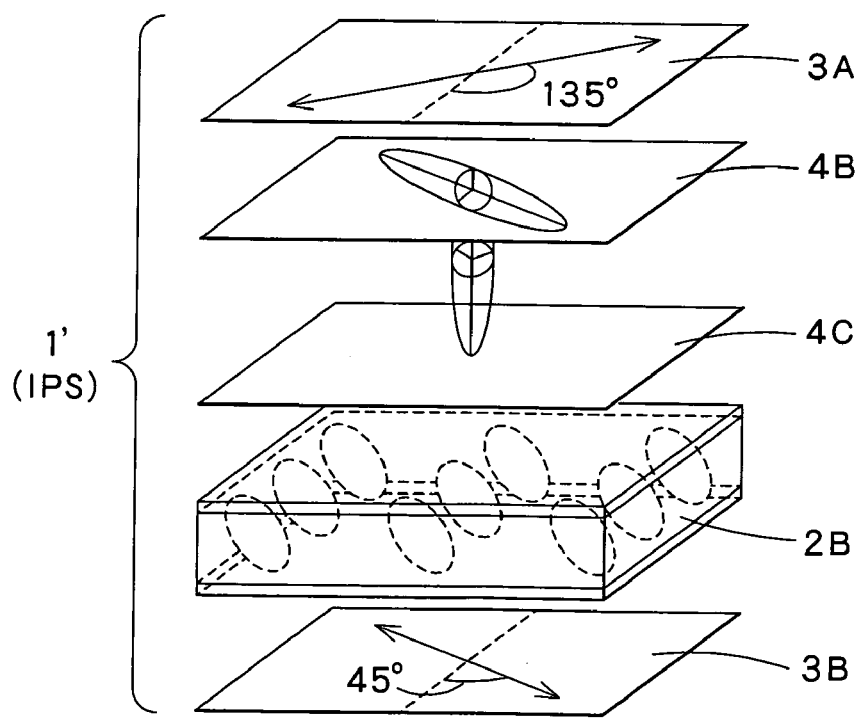
F I G. 4

OPTICAL COMPENSATOR ELEMENT AND LIQUID CRYSTAL DISPLAY USING THE SAME

BACKGROUND OF THE INVENTION

1. Field of the Invention

The present invention relates to an optical compensator element, in which the level of phase difference is variable by the application of voltage, and a liquid crystal display using the same.

2. Background Art

Liquid crystal displays (hereinafter referred to as "LCDs") have features of thin, lightweight, low power consumption, and freedom from flicker. For this reason, LCDs are extensively used in various displays, that is, large stationary displays, as well as displays of portable terminal equipment and the like.

In the case of portable terminal equipment, what is sometimes required of displays is that display can be seen only by the user while the display cannot be seen by a person(s) around the user. On the other hand, in some cases, display should be positively seen by a person(s) around the display. These are true of large and stationary displays.

In recent years, spread of digital still cameras, an improvement in communication infrastructure and the like have led to ever-increasing cases where photographs and motion images are displayed on a display of portable terminal equipment. A typical example thereof is a portable (cellular) phone. In displaying photographs or the like on the display screen of the portable phone, when it is desired that a plurality of observers around the display can see the display, the angle of visibility of the display is desired to be satisfactorily wide. For example, in LCDs, the angle of visibility can be increased by applying a phase difference film to a liquid crystal cell. In the case of transmission and receipt of electronic mails (E-mails) or the like, it is preferred that the display can be seen only by the sender or receiver and cannot be seen by persons, other than the sender or the receiver, around the display. In this case, the angle of visibility of the display screen should be reduced.

Accordingly, display which can realize switching between a wide angle of visibility and a narrow angle of visibility through a simple operation has been desired.

The angle of visibility of LCD per se is intrinsically narrow. The reason for this is that increasing the angle of visibility causes leakage of light from pixels which should display black, resulting in a change in color tone or tone reversal or the like. In order to increase the angle of visibility, a reduction in leakage of light from pixels, which should display black, in all the direction of angle of visibility is effective.

An optical compensation film formed of an optically anisotropic transparent film has been widely utilized as means for increasing the angle of visibility of LCDs. This optical compensation film can be prepared, for example, by monoaxially or biaxially stretching a transparent resin film, for example, polycarbonate, polyethylene terephthalate, or polyolefin such as polyethylene. Further, in recent years, an optical compensation film utilizing a liquid crystal layer which can be fixed while maintaining the liquid crystal phase has also been reported. In use, in general, these optical compensation films are applied to a polarizing plate, followed by application to a liquid crystal cell.

Modes of LCDs include twisted nematic (hereinafter abbreviated to TN) mode, homeotropic alignment or vertical alignment (hereinafter abbreviated to VA) mode, in plane switching (hereinafter abbreviated to IPS) mode, and optically compensated bend (hereinafter abbreviated to OCB) mode. Among them, discotic liquid crystal or nematic liquid crystal, which has been fixed by hybrid alignment, is used as the optical compensation film for TN-mode LCDs, a combination of a positive A plate with a negative C plate is used as the optical compensation film for VA-mode LCDs, and a combination of a positive A plate with a positive C plate is used as the optical compensation film for IPS-mode LCDs, and a biaxially stretched transparent resin film is used as the optical compensation film for OCB-mode LCDS.

In a construction in which an optical compensation film (a phase difference film) for realizing a wide angle of visibility is applied and fixed to a display, however, when realization of a narrow angle of visibility is contemplated, the optical compensation film should be separated, and, consequently, switching between a wide angle of visibility and a narrow angle of visibility could not be carried out through a simple operation.

SUMMARY OF THE INVENTION

The present inventors have now found that, when a liquid crystal layer is held between a pair of transparent substrates each provided with an aligning layer, an electrode and the like on their respective sides which face each other, switching between a wide angle of visibility and a narrow angle of visibility can be carried out by controlling the aligned state of the liquid crystal layer by the applied voltage. The present invention has been made based on such finding.

Accordingly, an object of the present invention is to provide an optical compensator element which can realize switching between a wide angle of visibility and a narrow angle of visibility through a simple operation and to provide a liquid crystal display using the same.

The optical compensator element according to the present invention comprises: a pair of opposed substrates; electrodes provided on said pair of opposed substrates in their respective sides which face each other; and a variable phase difference layer provided between said pair of substrates, the level of the phase difference being electrically controllable.

Unlike the conventional LCD in which, in use, an optical compensation film is applied to a display, according to the construction of the present invention, two transparent substrates are provided, an aligning layer, an electrode and the like are provided in each of the two transparent substrates so that one of the two transparent substrates on its side where the aligning layer, the electrode and the like have been provided faces the other transparent substrate on its side where the aligning layer, the electrode and the like have been provided, and a liquid crystal layer is held between the two transparent substrates, whereby the aligned state of the liquid crystal layer can be controlled by the applied voltage. This construction can realize a voltage-variable optical compensation layer (a variable phase difference layer) in which switching between a wide angle of visibility and a narrow angle of visibility can be carried out.

The present invention is constructed so that the level of phase difference is varied by electrical control. Therefore, the use of a combination thereof with a liquid crystal display device can provide a view angle-variable optical compensator element which can realize switching between a wide angle of visibility and a narrow angle of visibility through a simple operation.

BRIEF DESCRIPTION OF THE DRAWINGS

FIG. 1 is a diagram showing an arrangement of an optical compensation layer in a conventional VA-mode LCD;

FIG. 2 is a diagram showing the state of a wide angle of visibility in the case where the optical compensator element according to the present invention has been applied to a VA-mode LCD;

FIG. 3 is a diagram showing the state of a narrow angle of visibility in the case where the optical compensator element according to the present invention has been applied to a VA-mode LCD;

FIG. 4 is a diagram showing an arrangement of an optical compensation layer in a conventional IPS-mode LCD;

DETAILED DESCRIPTION OF THE INVENTION

LCDs to which the optical compensator element according to the present invention has been applied will be described in comparison with the conventional LCD.

Figure 5:
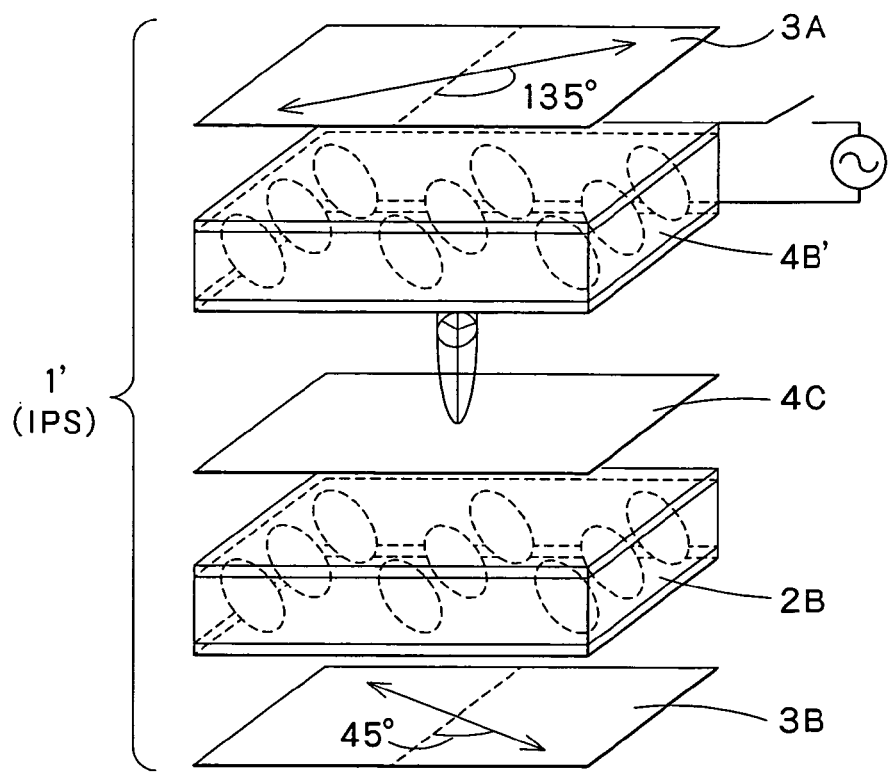
FIG. 5 is a diagram showing the state of a wide angle of visibility in the case where the optical compensator element according to the present invention has been applied to an IPS-mode LCD.
Figure 6:
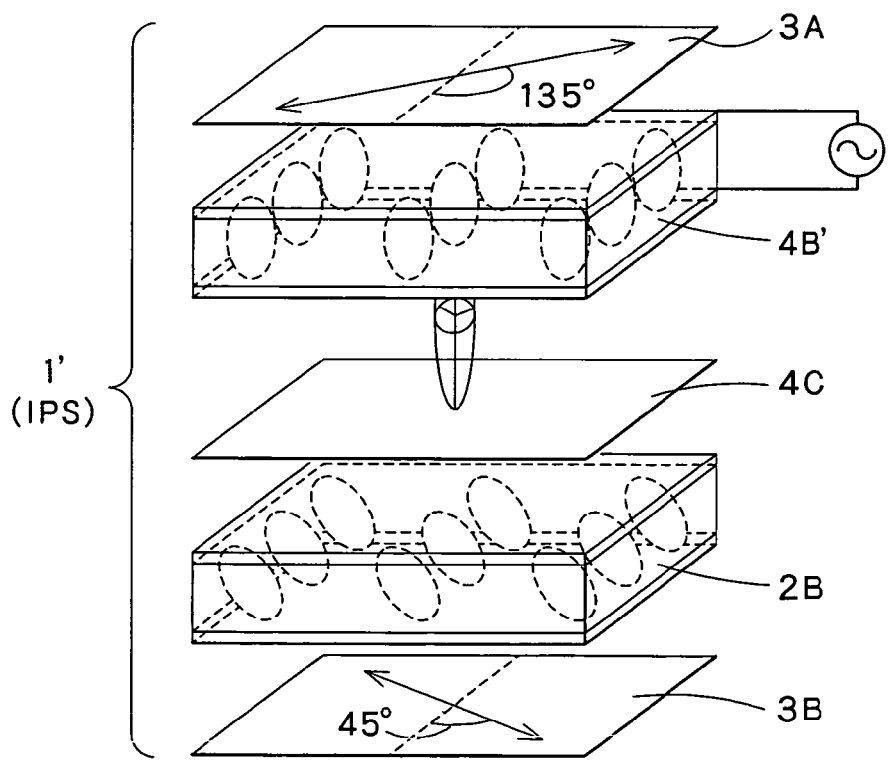
FIG. 6 is a diagram showing the state of a narrow angle of visibility in the case where the optical compensator element according to the present invention has been applied to an IPS-mode LCD.

FIG. 1 is a diagram showing an arrangement of an optical compensation film in a conventional VA-mode LCD. FIGS. 2 and 3 each are a diagram showing a VA-mode LCD in the case where the optical compensator element according to the present invention has been applied. FIG. 4 is a diagram showing an arrangement of an optical compensation film in a conventional IPS-mode LCD. FIGS. 5 and 6 each are a diagram showing an IPS-mode LCD in the case where the optical compensator element according to the present invention has been applied. In all the drawings, for clear explanation, the layers are drawn in a mutually separated state. Preferably, however, they are in a mutually stacked state.

As shown in FIG. 1, the conventional VA-mode LCD 1 is constructed so that a homeotropically aligned liquid crystal cell 2A is held between two polarizing plates 3A, 3B in which the polarization direction of the polarizing plate 3A (an arrow in the drawing representing an absorption axis of the polarizing plate) and the polarization direction of the polarizing plate 3B (an arrow in the drawing representing an absorption axis of the polarizing plate) are perpendicular to each other. In the embodiment shown in the drawing, an optical compensation layer 4A as a negative C plate and an optical compensation layer 4B as a positive A plate are stacked in that order, from the homeotropically aligned liquid crystal cell 2A side, between the homeotropically aligned liquid crystal cell 2A and one of the polarizing plates 3A so that a wide angle of visibility is provided.

When a property that the plate is changed to a positive C plate by varying the voltage is imparted to at least one of a negative C plate (4A) and a positive A plate (4B) in the conventional VA-mode LCD 1, a property that the display of a narrow angle of visibility can be realized is provided.

In the case of the negative C plate (4A), when the nematic liquid crystal formed of rod-like molecules is spirally aligned, the plate can be brought to a positive C plate by electrical control. Specifically, this state can be realized by holding a liquid crystal material, prepared by incorporating a chiral agent in a nematic liquid crystal having positive dielectric anisotropy, between horizontally aligned transparent films each with a transparent electrode.

Thus, the formation of a phase difference layer formed of nematic liquid crystal molecules having positive dielectric anisotropy causes alignment of the nematic liquid crystal in the thickness-wise direction of the substrate upon the application of voltage to a direction perpendicular to the substrate, which can facilitate the control of the level of phase difference of the optical compensator element.

In the case of the positive A plate (4B), when the nematic liquid crystal is homogeneously aligned, the plate can be brought to a positive C plate by electrical control. Specifically, this state can be realized by allowing two transparent films each provided with a transparent electrode holding the liquid crystal material therebetween to be made identical to each other in the direction of the horizontal aligning treatment.

For both the negative C plate (4A) which can be brought to a positive C plate and the positive A plate (4B) which can be brought to a positive C plate, the application of voltage to the liquid crystal material develops such an aligned state that liquid crystal molecules stand against the substrate, whereby they can function as a positive C plate. When any voltage is not applied, the positive C plate is returned to the original state of negative C plate (4A) or positive A plate (4B). Further, the application of voltage provides a narrow angle of visibility while, when any voltage is not applied, a wide angle of visibility is provided.

Accordingly, in a VA-mode LCD constructed by replacing the positive A plate (4B) in the conventional VA-mode LCD with an optical compensator element 4B' which can be brought to a positive C plate as shown in FIG. 2, when any voltage is not applied to the optical compensation layer 4B', liquid crystal molecules are horizontally aligned and, thus, a wide angle of visibility is provided. On the other hand, as shown in FIG. 3, when voltage is applied to the optical compensator element 4B', the horizontally aligned liquid crystal molecules become aligned in a direction perpendicular to the transparent film of the substrate and, thus, the function can be converted from the positive A plate to a positive C plate.

In the embodiment which has been described with reference to FIGS. 2 and 3, the optical compensator element 4B' is provided in a construction comprising a homeotropically aligned liquid-crystal cell 2A, an optical compensation layer 4A, and an optical compensator element 4B' stacked in that order. The construction, however, is not limited to this only and may be any one so far as the optical compensator element 4B' is not held between the homeotropically aligned liquid crystal cell 2A and the optical compensation layer 4A. Also in the case where an optical compensator element 4A' in which a negative C plate (4A) can be brought to a positive C plate is used, in the construction in which the optical compensator element 4A' may be provided, the optical compensator element 4A' may be stacked in any order so far as the optical compensation layer 4B is not held between the homeotropically aligned liquid crystal cell 2A and the optical compensation layer 4A'.

As shown in FIG. 4, the conventional IPS-mode LCD 1 is constructed so that a horizontally aligned liquid crystal cell 2B is held between two polarizing plates 3A, 3B in which the polarization direction of the polarizing plate 3A (an arrow in the drawing representing an absorption axis of the polarizing plate) and the polarization direction of the polarizing plate 3B (an arrow in the drawing representing an absorption axis of the polarizing plate) are perpendicular to each other. In the embodiment shown in the drawing, an optical compensation layer 4C as a positive C plate and an optical compensation layer 4B as a positive A plate are stacked in that order, from the horizontally aligned liquid crystal cell 2B side, between the horizontally aligned liquid crystal cell 2B and one of the polarizing plates 3A so that a wide angle of visibility is provided.

When a property that the plate is changed to a positive C plate by varying the voltage is imparted to a positive A plate (4B) in the conventional IPS-mode LCD 1, a property that the display of a narrow angle of visibility can be realized is provided.

In the present invention, in the positive A plate (4B), the material used is such that the application of voltage to the liquid crystal material develops such an aligned state that liquid crystal molecules stand against the substrate. When this material is used, the positive A plate can be allowed to function as a positive C plate. When voltage is not applied, the plate is returned to the original positive A plate (4B). Therefore, the application of voltage provides a narrow angle of visibility while, when voltage is not applied, a wide angle of visibility is provided.

Specifically, in the present invention, the positive A plate (4B) in the conventional IPS-mode LCD is replaced with an optical compensator element (4B'), which can be brought to a positive C plate as shown in FIG. 5, to constitute an IPS-mode LCD 1'. According to this construction, when any voltage is not applied to the optical compensator element 4B', liquid crystal molecules are horizontally aligned and, thus, a wide angle of visibility is provided. On the other hand, as shown in FIG. 6, when voltage is applied to the optical compensator element 4B', the horizontally aligned liquid crystal molecules become aligned in a direction perpendicular to the substrate and, thus, the function can be converted from the positive A plate to a positive C plate.

In the embodiment which has been described with reference to FIGS. 5 and 6, the optical compensator element 4B' is provided in a construction comprising a horizontally aligned liquid crystal cell 2B, an optical compensation layer 4C, and an optical compensator element 4B' stacked in that order.

The optical compensator element according to the present invention has a laminated structure comprising a predetermined liquid crystal material held between aligned transparent films each with a transparent electrode. Alternatively, for the construction of the optical compensator element, a transparent plate such as a glass plate or a quartz plate may be used instead of the transparent film. The transparent film may be formed of, for example, polycarbonate, polymethyl methacrylate, polyethylene terephthalate, or triacetylcellulose, or a resin such as polyether sulfone, polysulfone, polypropyrene, polyimide, polyamideimide, or polyether ketone.

In the above description, an optical compensator element, which can be applied to transmission LCD and can realize switching of angle of visibility by the application of voltage, has been described by taking transmission LCD as an example. However, it should be noted that LCD is not limited to transmission LCD and the present invention can also be applied to other LCDs. For example, for all LCDs in which optical compensation is carried out using a birefringence layer, for example, reflection LCDs or semitransmission semireflection LCDs as well, the present invention can be applied by regulating the alignment of liquid crystal molecules, the thickness of the liquid crystal layer, the applied voltage or the like in the optical compensator element.

Likewise, the optical compensator element according to the present invention can be applied to TN-mode LCDs and OCB-mode LCDS.

EXAMPLES

Example 1

(1) Preparation of Optical Compensator Element

An ITO thin film was formed as a transparent electrode on a glass substrate subjected to cleaning (part number: 1737, manufactured by Corning Incorporated). Next, a polyimide resin aligning agent (tradename "OPTMER AL1254", manufactured by JSR Corporation) was applied by flexographic printing on the ITO thin film, and the print was heat dried, followed by rubbing treatment to form an aligning film. The two glass substrates on which the transparent electrode and the aligning film had been formed thus obtained were provided and were disposed so that the aligning film sides face each other. A spacer (spherical particles with a diameter of 2 μm; tradename "Micropearl", manufactured by SEKISUI CHEMICAL CO.,LTD.) was provided between the two substrates, and the peripheries of the two substrates were bonded to each other through the spacer. The space within the laminated glass substrates was filled with a liquid crystal material having positive dielectric anisotropy by vacuum injection, followed by sealing. Thus, an optical compensator element was prepared. The optical compensator element thus obtained was such that an A plate was provided in a voltage non-applied state while a C plate was provided in a voltage applied state, that is, switching between the A plate and the C plate could be realized by the voltage. The applied voltage was a frequency 160 Hz, 6-V rectangular wave.

(2) Preparation of VA-Mode LCD

A VA-mode LCD was prepared in the same manner as in the above optical compensator element, except that beads with a diameter of 4 μm were used as the spacer, a vertically aligning film subjected to no rubbing treatment was formed as an aligning film on the substrate, and a liquid crystal material having negative dielectric anisotropy was used as the liquid crystal material.

(3) Preparation of VA-Mode LCD which can Realize Switching between Wide Angle of Visibility and Narrow Angle of Visibility A negative C plate and the optical compensator element prepared above were stacked in that order on the VA-mode LCD prepared above. One polarizing plate was stacked under the VA-mode LCD, and another polarizing plate was stacked on the optical compensator element so that the polarization direction of one polarizing plate was orthogonal to the polarization direction of the other polarizing plate.

Example 2

(1) Preparation of IPS-Mode LCD

An IPS-mode LCD was prepared in the same manner as in the optical compensator element of Example 1, except that beads with a diameter of 3.5 μm were used as the spacer, a horizontally aligning film subjected to rubbing treatment was formed as an aligning film on the substrate, and a liquid crystal material having positive dielectric anisotropy was used as the liquid crystal material.

(2) Preparation of IPS-Mode LCD which can Realize Switching between Wide Angle of Visibility and Narrow Angle of Visibility A positive C plate and the optical compensator element as prepared in Example 1 were stacked in that order on the IPS-mode LCD prepared above. One polarizing plate was stacked under the IPS-mode LCD, and another polarizing plate was stacked on the optical compensator element so that the polarization direction of one polarizing plate was orthogonal to the polarization direction of the other polarizing plate.

Black display was provided using the VA-mode LCD and the IPS-mode LCD prepared in the above Examples, and light leakage in OFF state, that is, in such a state that no voltage was applied to the optical compensator element, and light leakage in ON state, that is, in such a state that voltage was applied to the optical compensator element, were measured with a liquid crystal angle of visibility/chromaticity characteristics measuring apparatus (tradename "EZContrast", manufactured by ELDIM, France).

The results were as shown in FIGS. 7 to 10.

Figure 7:
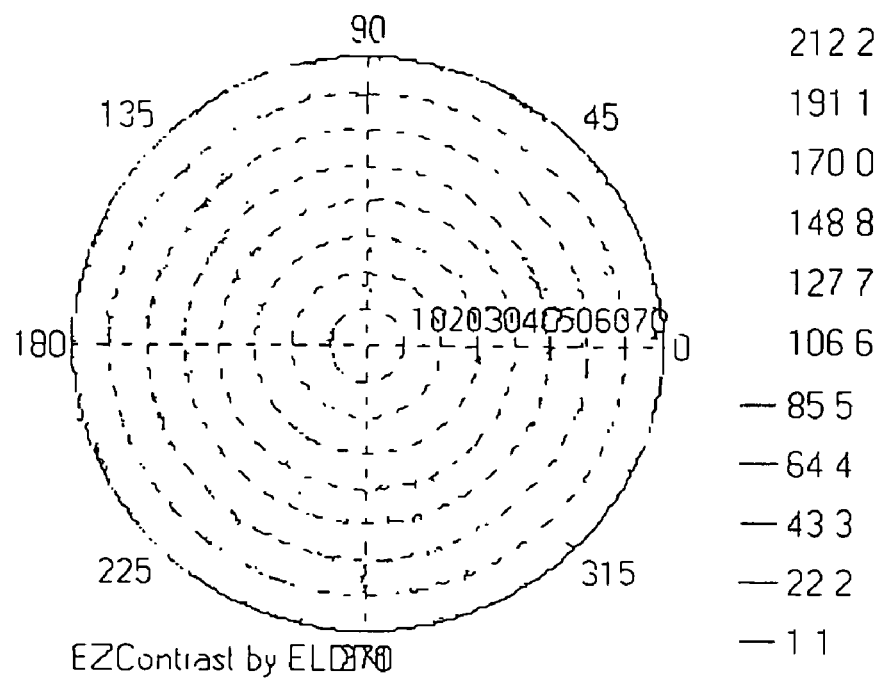
FIG. 7 is a diagram showing a brightness distribution in the case where an electric potential is not applied to an optical compensation layer applied to a VA-mode LCD.

The absorption axis in the polarizing plate is between 0 degree and 90 degrees. FIG. 7 is a diagram showing such a state that a power supply of the optical compensator element on the VA-mode LCD is OFF, FIG. 8 a diagram showing such a state that a power supply of the optical compensator element on the VA-mode LCD is ON, FIG. 9 a diagram showing such a state that a power supply of the optical compensator element on the IPS mode LCD is OFF, and FIG. 10 a diagram showing such a state that a power supply of the optical compensator element on the IPS mode LCD is ON.

Numerals described on the outermost periphery represent azimuth, and numerals described from the inner side toward the outer side of the concentric circles each represent the angle of visibility indicated by the circle on the left side of the numeral (an angle to a line perpendicular to the direction of observation). In each drawing, an iso-brightness diagram described by lines (unit: cd/m$^2$) indicated on the right side of the drawing is shown. In FIGS. 7 and 9, since there is no light leakage, the brightness was substantially 0 (zero) over the whole region. On the other hand, in FIGS. 8 and 10, light leakage in directions of 45 degrees, 135 degrees, 225 degrees, and 315 degrees is shown as an iso-brightness diagram in which the maximum brightness is observed at an angle of visibility around 60 to 70 degrees.

It is apparent that, in both the VA-mode LCD and the IPS-mode LCD, in such a state that the power supply of the optical compensator element is OFF, little or no light leakage occurs (FIGS. 7 and 9), and light leakage can be effectively suppressed over all the azimuthes and all the angles of visibility.

Figure 8:
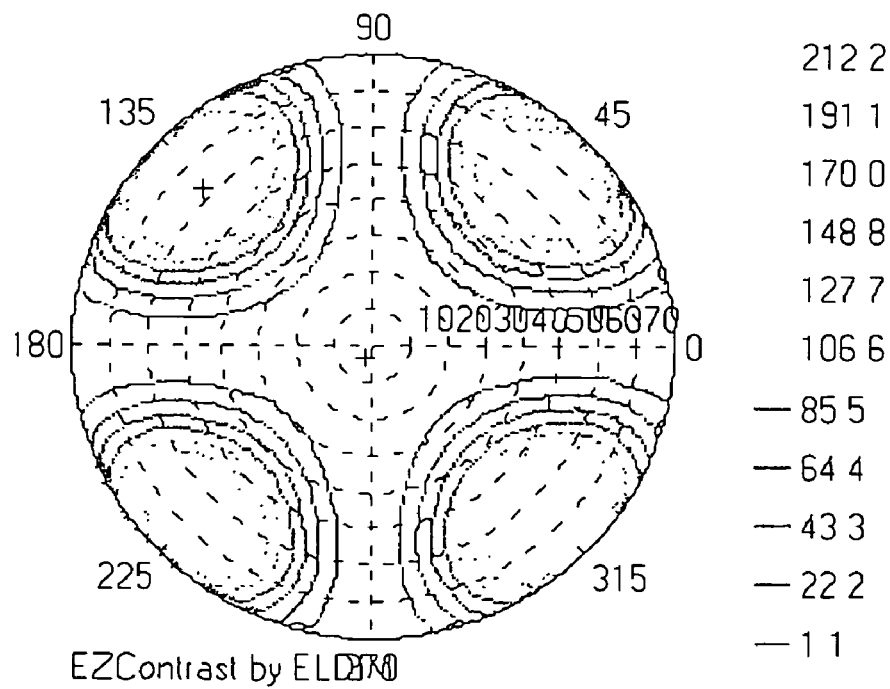
FIG. 8 is a diagram showing a brightness distribution in the case where an electric potential is applied to an optical compensation layer applied to a VA-mode LCD.
Figure 9:
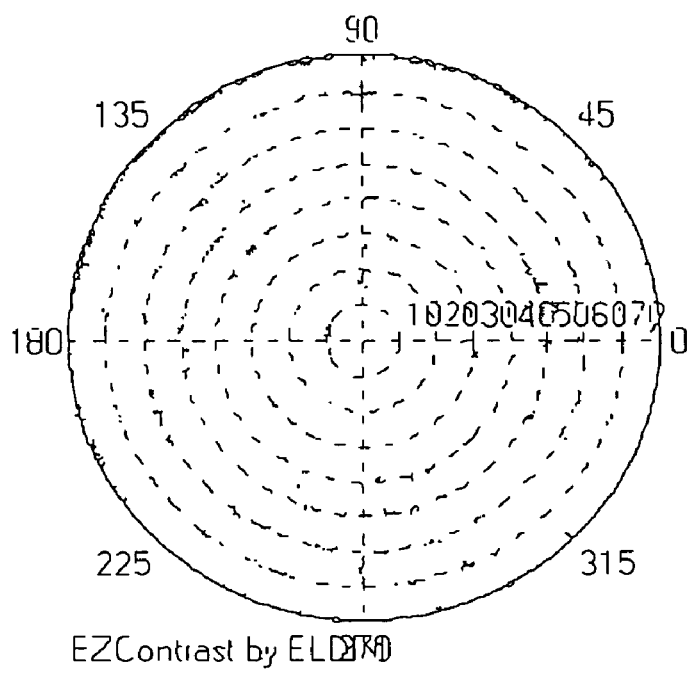
FIG. 9 is a diagram showing a brightness distribution in the case where an electric potential is not applied to an optical compensation layer applied to an IPS-mode LCD.
Figure 10:
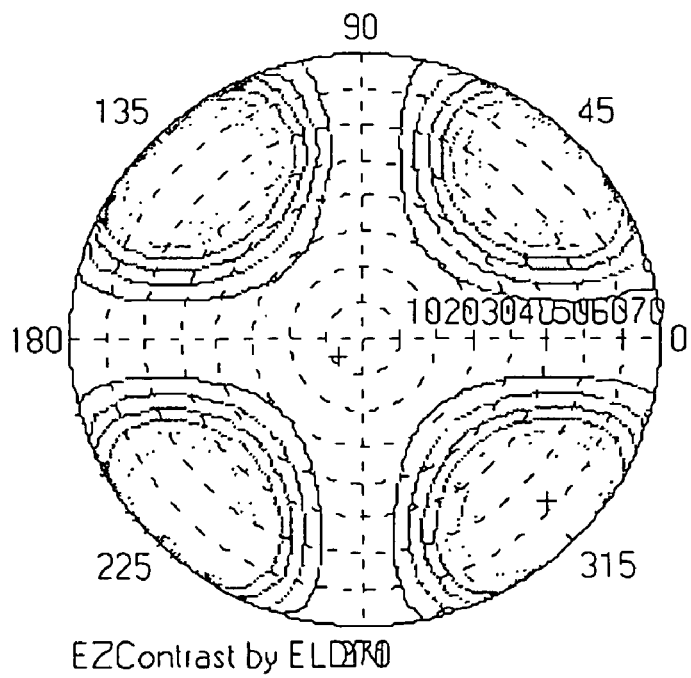
FIG. 10 is a diagram showing a brightness distribution in the case where an electric potential is applied to an optical compensation layer applied to an IPS-mode LCD.

Further, in both the VA-mode LCD and the IPS-mode LCD, in such a state that the power supply is ON, when the angle of visibility is in the range of 0 degree to + about 20 degrees or 0 degree to − about 20 degrees, little or no light leakage occurs over all the azimuthes (FIGS. 8 and 10). On the other hand, in the direction between absorption axes of the polarizing plate (directions of 45 degrees, 135 degrees, 225 degrees, and 315 degrees in FIGS. 8 and 10), increasing the angle of visibility enhances the brightness, that is, results in increased light leakage (when the position in each iso-brightness diagram is closer to the center part, the improvement in brightness is better). Light leakage during display of black causes tone reversal or a change in color tone. Therefore, the visibility deteriorates with increasing the angle of visibility.

What is claimed is:

1. An optical compensator element comprising: a pair of opposed substrates; electrodes provided on said pair of opposed substrates on their respective sides which face each other; and a variable phase difference layer provided between said pair of substrates, a level of a phase difference being electrically controllable,
   wherein the compensator element is used in combination with a liquid crystal display device for switching an angle of visibility of the display device,
   wherein the angle of visibility of the display device is switched by a change in the level of the phase difference,
   wherein said variable phase difference layer comprises nematic liquid crystal molecules having positive dielectric anisotropy, and
   wherein the optical compensator element functions as a positive A plate or a negative C plate when no voltage is applied to the optical compensator element, and functions as a positive C plate when a voltage is applied to the optical compensator element.

2. A liquid crystal display comprising an optical compensator element according to claim 1.

3. A liquid crystal display device comprising a liquid crystal display according to claim 2 disposed therein.

* * * * *